(12) United States Patent
Kamata et al.

(10) Patent No.: US 11,196,069 B2
(45) Date of Patent: Dec. 7, 2021

(54) FUEL CELL SYSTEM

(71) Applicant: Panasonic Intellectual Property Management Co., Ltd., Osaka (JP)

(72) Inventors: Tomoya Kamata, Osaka (JP); Takashi Kakuwa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 75 days.

(21) Appl. No.: 16/380,332

(22) Filed: Apr. 10, 2019

(65) Prior Publication Data

US 2019/0356003 A1 Nov. 21, 2019

(30) Foreign Application Priority Data

May 16, 2018 (JP) .............................. JP2018-094349

(51) Int. Cl.
*H01M 8/04858* (2016.01)
*H01M 8/04746* (2016.01)
(Continued)

(52) U.S. Cl.
CPC ....... *H01M 8/0491* (2013.01); *H01M 8/0494* (2013.01); *H01M 8/04776* (2013.01);
(Continued)

(58) Field of Classification Search
CPC ..... H01M 2008/1293; H01M 8/04298; H01M 8/043; H01M 8/04425; H01M 8/04589;
(Continued)

(56) References Cited

U.S. PATENT DOCUMENTS

2016/0329584 A1 11/2016 Onuma et al.

FOREIGN PATENT DOCUMENTS

| EP | 1703577 A1 | 9/2006 |
| EP | 2211413 A1 | 7/2010 |

(Continued)

OTHER PUBLICATIONS

Machine Translation JP2013229228A (Year: 2013).*
The Extended European Search Report dated Jul. 30, 2019 for the related European Patent Application No. 19166436.6.

*Primary Examiner* — Victoria H Lynch
(74) *Attorney, Agent, or Firm* — McDermott Will and Emery LLP

(57) ABSTRACT

A fuel cell system includes a fuel cell stack that generates electricity using fuel and oxidant gases, a reformer that produces the fuel gas by reforming a raw material, a raw material feeder that supplies the raw material to the reformer, a combustor that combusts anode off-gas discharged from the anode of the fuel cell stack, and a controller that controls the raw material feeder. The period of a load-following operation in which the power output of the fuel cell stack shifts from a lower level to a higher level, is divided into multiple sub-periods. For each sub-period, a ratio is determined from the increase amounts in the flow rate of the raw material during the sub-period and the length of the sub-period. The controller controls the raw material feeder to make a ratio on the higher output side smaller than another on the lower output side.

9 Claims, 3 Drawing Sheets

(51) Int. Cl.
*H01M 8/04828* (2016.01)
*H01M 8/0612* (2016.01)
*H01M 8/12* (2016.01)
*H01M 8/124* (2016.01)

(52) U.S. Cl.
CPC .......... *H01M 8/0618* (2013.01); *H01M 8/12* (2013.01); *H01M 2008/1293* (2013.01)

(58) Field of Classification Search
CPC .......... H01M 8/04776; H01M 8/0491; H01M 8/0494; H01M 8/04992; H01M 8/0618; H01M 8/12
See application file for complete search history.

(56) References Cited

FOREIGN PATENT DOCUMENTS

| | | | | |
|---|---|---|---|---|
| EP | 2237352 | A2 | 10/2010 | |
| EP | 3026746 | A1 | 6/2016 | |
| JP | 2010-092836 | | 4/2010 | |
| JP | 2013229228 | A * | 11/2013 | .............. H01M 8/04 |

* cited by examiner

FUEL CELL SYSTEM

BACKGROUND

1. Technical Field

The present disclosure relates to a fuel cell system.

2. Description of the Related Art

A fuel cell system usually controls its power output once its fuel cell stack reaches a temperature equal to or higher than a rated temperature. During this process of controlled power generation, the electricity produced by the fuel cell stack is substantially equal to that consumed by the external load (load-following operation).

In a load-following operation, the combusting of fuel in the combustor can be unstable because the fuel supply to the combustor falls when the power output of the fuel cell stack shifts from a higher (high-load range) level to a lower level (low-load range). As a solution to this, Japanese Patent No. 5412960 proposes setting the fuel utilization in a solid oxide fuel cell stack (SOFC stack) lower in the low-load range than in the high-load range. This improves the condition of combustion in the combustor in the low-load range by increasing the amount of fuel that is supplied to the combustor but without contributing to the power generation by the SOFC stack in that range.

Japanese Patent No. 5412960 also proposes reducing the percentage decrease in the fuel utilization in the SOFC stack with increasing load within a load range in which the load is smaller than a predetermined limit. When the load is high within a load range, the absolute fuel supply is relatively large, and the SOFC stack temperature is also kept sufficiently high. Reducing the percentage decrease in the fuel utilization in the SOFC stack (i.e., milder decrease) with increasing load in that range therefore leads to less wasteful fuel consumption (combustion) in the combustor.

SUMMARY

Japanese Patent No. 5412960, however, ignores the issue of combustor performance during load-following operations in which the power output of the fuel cell stack shifts from a lower level to a higher level (hereinafter low-to-high load-following operations).

One non-limiting and exemplary embodiment provides a fuel cell system that can perform better than the related art in low-to-high load-following operations while maintaining stable combustion in a combustor.

In one general aspect, the techniques disclosed here feature a fuel cell system. The fuel cell system includes a fuel cell stack that generates electricity using fuel gas and oxidant gas, a reformer that produces the fuel gas by reforming a raw material, a raw material feeder that supplies the raw material to the reformer, a combustor that combusts anode off-gas discharged from an anode of the fuel cell stack, and a controller that controls the raw material feeder. The period of a load-following operation in which the power output of the fuel cell stack shifts from a lower level to a higher level, is divided into n sub-periods s1, s2, . . . , and sn, where n is a natural number of 2 or more, the increase amounts in the flow rate of the raw material during the n sub-periods are defined as f1, f2, . . . , and fn, where n is a natural number of 2 or more, and n ratios determined from the length of a sub-period sx selected from the n sub-periods and the increase amounts fx in the flow rate of the raw material during the selected sub-period sx are defined as rx, rx=fx/length of sx, where x is a natural number and $1 \leq x \leq n$. When two ratios are selected from the n ratios with the ratio on the lower output side as a first ratio and the ratio on the higher output side as a second ratio, the controller controls the raw material feeder to make the second ratio smaller than the first ratio.

The fuel cell system according to an aspect of the present disclosure is advantageous in that it can perform better than the related art in low-to-high load-following operations while maintaining stable combustion in a combustor.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
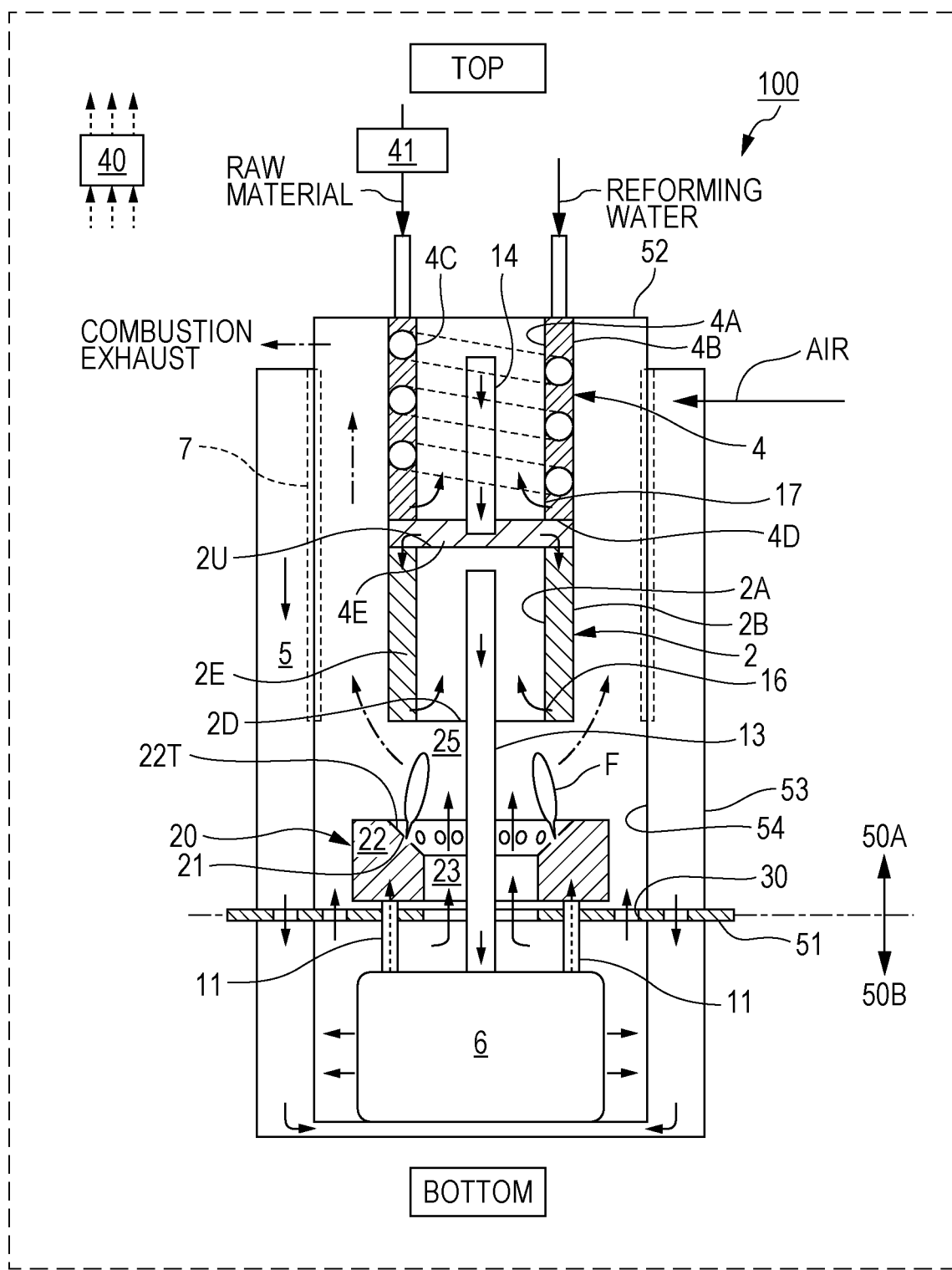
FIG. 1 illustrates an example of a fuel cell system according to an embodiment.

The inventors extensively studied the issue of combustor performance during low-to-high load-following operations with the following findings.

To conduct the study with, the inventors fabricated a device for experimental combustion, a device consisting only of a combustor 20 as described hereinafter (FIG. 1) (hereinafter referred to as the test device), and experimentally determined the misfire limit of the test device at three typical operation points between the low (1 A) and high current outputs (7 A) of the device's fuel cell stack (current outputs of 2 A, 5 A, and 7 A).

The experiment was performed using mimicking gases, specifically mixtures of hydrogen ($H_2$), nitrogen ($N_2$), and a trace of town gas, prepared to the compositions of anode off-gases produced at the respective operation points. The mixtures had a hydrogen concentration equivalent to that of the anode off-gases and contained nitrogen gas in place of carbon dioxide ($CO_2$), steam ($H_2O$), and other gas components in the anode off-gases. The trace of town gas was added to produce a visible flame in the test device. The flow rate of air into the test device was set as it would be in load-following operations of a fuel cell system.

Table 1 presents the results of experimental combustion performed under the above conditions.

TABLE 1

| Current output of the SOFC stack (A) | 2 | 5 | 7 |
|---|---|---|---|
| Normal fuel utilization (%) | 35 | 70 | 75 |
| Critical fuel utilization (%) | 75 | 78 | 78 |

In Table 1, the upper row presents fuel utilization percentages that are common at the respective operation points in the load-following operation of a fuel cell system (hereinafter normal fuel utilization).

A fuel utilization corresponds to the percentage of heat of the fuel used by the fuel cell stack to generate electricity to the total heat of the fuel supplied to the fuel cell stack. It is therefore usual to reduce the fuel utilization with smaller current output of the fuel cell stack (i.e., lower flow rate of the fuel) to enable autothermal operation of the fuel cell system. For example, when the current output of the fuel cell stack is 2 A, the normal fuel utilization is approximately 35%. At large current outputs of the fuel cell stack, by contrast, it is customary to increase the fuel utilization to enable highly efficient operation of the fuel cell system because the temperature of the fuel cell stack has been sufficiently high. For example, when the current output of the fuel cell stack is 7 A, the normal fuel utilization is approximately 75%.

The lower row in Table 1 presents fuel utilization percentages at which the test device misfires (hereinafter critical fuel utilization). These are experimental data obtained through experimental combustion in the test device at the respective operation points using mimicking gases prepared to the compositions of anode off-gases at fuel utilization percentages higher than the normal.

By comparing the normal and critical fuel utilization in Table 1, the inventors found that when the current output of the fuel cell stack is 2 A, for example, there is a sufficiently large difference between the normal (35%) and critical fuel utilization (75%). In this case, the test device would be unlikely to misfire even if the fuel utilization in the fuel cell stack fluctuated, for example because of a disturbance.

When the current output of the fuel cell stack is 7 A, by contrast, there is little difference between the normal (75%) and critical fuel utilization (78%). In this case, fluctuations in the fuel utilization in the fuel cell stack, for example resulting from a disturbance, would likely cause the test device to misfire.

By focusing on this quantitative relationship between normal and critical fuel utilization, the inventors discovered an advantageous load-following operation, in which the power output of a fuel cell stack shifts from a lower level to a higher level without affecting stable combustion in a combustor, and thus arrived at an aspect of the present disclosure.

That is, a fuel cell system according to a first aspect of the present disclosure includes a fuel cell stack that generates electricity using fuel gas and oxidant gas, a reformer that produces the fuel gas by reforming a raw material, a raw material feeder that supplies the raw material to the reformer, a combustor that combusts anode off-gas discharged from an anode of the fuel cell stack, and a controller that controls the raw material feeder. The period of a load-following operation in which the power output of the fuel cell stack shifts from a lower level to a higher level, is divided into n sub-periods $s1, s2, \ldots,$ and sn, where n is a natural number of 2 or more, the increase amounts in the flow rate of the raw material during the n sub-periods are defined as $f1, f2, \ldots,$ and fn, where n is a natural number of 2 or more, and n ratios determined from the length of a sub-period sx selected from the n sub-periods and the increase amounts fx in the flow rate of the raw material during the selected sub-period sx are defined as rx, $rx=fx/$ length of sx, where x is a natural number and $1 \leq x \leq n$. When two ratios are selected from the n ratios with the ratio on the lower output side as a first ratio and the ratio on the higher output side as a second ratio, the controller controls the raw material feeder to make the second ratio smaller than the first ratio.

A fuel cell system according to a second aspect of the present disclosure is: in the fuel cell system according to the first aspect, the controller may control the raw material feeder to make the n ratios satisfy $r1>r2>\ldots>rn$. That is, the ratios may be smaller with increasing power output of the fuel cell stack.

Configured as above, the fuel cell systems according to these aspects perform better than the related art in low-to-high load-following operations while maintaining stable combustion in a combustor.

A fuel cell system according to a third aspect of the present disclosure is: in the fuel cell system according to the second aspect, the controller may control the raw material feeder to make the lengths of the n sub-periods satisfy $s1<s2<\ldots<sn$. That is, the sub-periods may be longer with increasing power output of the fuel cell stack. A fuel cell system according to a fourth aspect of the present disclosure is: in the fuel cell system according to the third aspect, the controller may increase the current output of the fuel cell stack during each of the sub-periods. Owing to these, the fuel cell systems according to these aspects are capable of proper increase in the fuel utilization in the fuel cell stack in low-to-high load-following operations.

If the sub-periods were shorter with increasing power output of the fuel cell stack, the fuel utilization would change more greatly with increasing power output. The combustor would therefore easily misfire at high output level because, as mentioned, there is little difference between the normal and critical fuel utilization when the power output of the fuel cell stack is high.

In the fuel cell systems according to the above aspects, by contrast, the change in the fuel utilization becomes milder with increasing power output of the fuel cell stack by virtue of the sub-periods set to be longer with increasing power output. The combustor therefore is less likely to misfire at high output level.

At low output level, too, the combustor does not easily misfire despite the shorter sub-periods than at higher output level because, as mentioned, there is a large difference between the normal and critical fuel utilization when the power output of the fuel cell stack is low. The fuel cell systems according to the third and fourth aspects, in which the sub-periods are set to be shorter with increasing power output, are therefore capable of low-to-high load-following operations shorter than they would otherwise be.

A fuel cell system according to a fifth aspect of the present disclosure is: in the fuel cell system according to the second or third aspect, the controller may control the raw material feeder to make the n increase amounts in the flow rate of the raw material satisfy $f1>f2>\ldots>fn$. That is, the increase amounts in the flow rate of the raw material may be smaller with increasing power output of the fuel cell stack. A fuel cell stack according to a sixth aspect of the present disclosure is: in the fuel cell system according to the fifth aspect, the controller may increase the current output of the fuel cell stack in each of the sub-periods. Owing to these, the fuel cell systems according to these aspects are capable of proper increase in the fuel utilization in the fuel cell stack in low-to-high load-following operations.

If the increase amounts in the flow rate of the raw material were larger with increasing power output of the fuel cell stack, the combustor would become more likely to misfire with increasing power output.

The following describes the reason for this with reference to the construction of the combustor 20 illustrated in FIG. 1. The following description is illustrative and not restrictive. For example, the description does not mean the combustor of the fuel cell systems according to these aspects needs to be like the combustor 20 illustrated in FIG. 1.

Assume diffusion combustion in the combustor 20 illustrated in FIG. 1, in which anode off-gas ejected from anode off-gas nozzles 21 and cathode off-gas coming through a first cathode off-gas pass-through 23 and a second cathode off-gas pass-through 30 are combusted in a combustion space 25. In this situation, making greater increase amounts in the flow rate of the raw material with increasing power output of the fuel cell stack means that the flow rate of the anode off-gas ejected from the anode off-gas nozzles 21 becomes faster with increasing power output. At high output level, therefore, the combustor 20 is easily caused to misfire by adverse effects (e.g., flame floating and vanishing in the combustion space 25) resulting from the increased flow rate of the anode off-gas at the anode off-gas nozzles 21 because, as mentioned, there is little difference between the normal and critical fuel utilization when the power output of the fuel cell stack is high.

In the fuel cell systems according to these aspects, by contrast, this disadvantage is not as serious by virtue of the increase amounts in the flow rate of the raw material set to be smaller with increasing power output of the fuel cell stack. The combustor therefore is less likely to misfire at high output level.

At low output level, too, the combustor does not easily misfire despite the larger increase amounts in the flow rate of the raw material than at higher output level because, as mentioned, there is a large difference between the normal and critical fuel utilization when the power output of the fuel cell stack is low. The fuel cell systems according to the fifth and sixth aspects, in which the increase amounts in the flow rate of the raw material are set to be larger on the lower output than on the higher output side, are therefore capable of increasing the flow rate of the raw material faster than it otherwise would.

A fuel cell system according to a seventh aspect of the present disclosure is: in the fuel cell system according to any one of the first to sixth aspects, the fuel cell stack may be a solid oxide fuel cell stack.

When a solid oxide fuel cell (SOFC) system is used, it is customary to increase the fuel utilization to make the SOFC stack more efficient in power generation. This means the combustor in an SOFC system easily misfires as a result of the anode off-gas, used as fuel for the combustor, becoming lean. The technical features of the above aspects are therefore advantageous especially to SOFC systems.

The following describes embodiments of the present disclosure with reference to the attached drawings. All embodiments are merely illustrations of the above aspects. Information such as values, shapes, materials, structural elements, configurations of and connections between the elements is given for illustrative purposes and is not intended to limit the above aspects unless it is given in a claim. Those elements that are not recited in an independent claim, which defines the most generic concept of an aspect, are described as optional. The drawings illustrate structural elements schematically to help understand and therefore may be inaccurate, for example in shape and relative dimensions.

EMBODIMENTS

FIG. 1 illustrates an example of a fuel cell system according to an embodiment.

In FIG. 1, the directions "TOP" and "BOTTOM" are defined as the top and bottom of the system for the sake of description. The gravity acts from top to bottom.

In the example illustrated in FIG. 1, the SOFC system 100 includes a reformer 2, a fuel cell stack 6, a combustor 20, a controller 40, and a raw material feeder 41.

The SOFC system 100 according to this embodiment also has a separator 51, which divides the inside of the SOFC system 100 into an upper section 50A and a lower section 50B. The upper section 50A contains components such as the reformer 2, an evaporator 4, and the combustor 20, whereas the lower section 50B contains components such as the fuel cell stack 6.

The raw material feeder 41 supplies a raw material to the reformer 2. The construction of the raw material feeder 41 is not critical as long as it can feed the raw material to the reformer 2. The raw material feeder 41 can be, for example, but is not limited to, a constant-volume pump.

The reformer 2 reforms a hydrocarbon-based raw material into a fuel gas (reformate gas) containing hydrogen. The reformer 2 in this embodiment is above the combustor 20 and has a side wall formed by an inner wall 2A and an outer wall 2B, but this is not the only possible configuration.

A reformer 2 having a side wall, however, transmits the heat of the combustion exhaust efficiently throughout the reforming catalyst 2E filling the side wall of the reformer 2 as long as the side wall has an appropriate thickness.

The inner wall 2A and outer wall 2B of the reformer 2 in the SOFC system 100 according to this embodiment are cylinders with different diameters, but the inner wall 2A and outer wall 2B may be in other forms, such as rectangular tubes. However, making the inner wall 2A and outer wall 2B of the reformer 2 as cylinders as in the SOFC system 100 according to this embodiment makes the reformer 2 less costly to produce because cylinders can be produced with a shorter length and fewer points of welding than rectangular tubes. Cylinders, moreover, can be thin by virtue of being resistant to gas pressure and thermal stress compared with rectangular tubes.

In the SOFC system 100 according to this embodiment, the upper end of the side wall of the reformer 2 is covered with an upper plate 2U, and the lower end of the side wall with a lower plate 2D. In the periphery of the upper plate 2U are multiple openings (not illustrated) through which the gas to be sent to the reforming catalyst 2E passes through.

As illustrated in FIG. 1, high-temperature combustion exhaust passes through the space between the outer wall 2B of the reformer 2 and the inner wall 54 of the enclosure of the SOFC system 100. The reforming catalyst 2E in the reformer 2 has therefore been heated by the heat of the combustion exhaust.

Near the lower end of the inner wall 2A of the reformer 2 is a turnaround section 16. The turnaround section 16 has multiple openings (not illustrated) created along the inner wall 2A. These openings are in the inner wall 2A and have such a size that the particles of the reforming catalyst 2E are blocked with the fuel gas allowed to pass through.

A fuel gas feed path 13 runs through the lower plate 2D airtightly, extending vertically upward inside the reformer 2. The upper end of the fuel gas feed path 13 is positioned lower than the upper plate 2U and at a level where the fuel gas can flow smoothly from the inside of the reformer 2 into the fuel gas feed path 13. The lower end of the fuel gas feed path 13 is connected to the fuel cell stack 6.

The reforming reaction performed in the reformer 2 can be in any form. For example, while the SOFC system 100 is in load-following operation, the reformer 2 is performing steam reforming. The reforming catalyst 2E typically contains at least one selected from the group consisting of noble metal catalysts, such as Pt, Ru, and Rh, and of Ni as catalytic metal(s).

The raw material may be a hydrocarbon-based gas, which contains an organic compound formed at least by carbon and hydrogen, such as town gas, natural gas, or LPG (all primarily methane), or a liquid hydrocarbon fuel, such as an alcohol, a biofuel, or diesel.

The water (steam) and raw material need to be supplied to the reformer 2 at a high temperature (e.g., approximately 400° C. to 700° C.).

To achieve this, the SOFC system 100 according to this embodiment has an evaporator 4 right above the upper plate 2U of the reformer 2, and the water (steam) and raw material are supplied to the reformer 2 via the evaporator 4. In the reformer 2, a fuel gas is produced that contains $H_2$, $CO_2$, and CO formed through reforming in layers of the reforming catalyst 2E filling the inside of the reformer 2, unreformed part of the raw material, and steam. The fuel gas is supplied to the anode of the fuel cell stack 6 through the fuel gas feed path 13.

The evaporator 4 has a side wall formed by an inner wall 4A and an outer wall 4B and also has a bottom portion 4E formed by the upper plate 2U of the reformer 2 and a lower plate 4D. The upper end of the side wall of the evaporator 4 is covered with the top panel 52 of the enclosure of the SOFC system 100, and the lower end of the side wall with the lower plate 4D. The side wall and bottom portion 4E of the evaporator 4 are therefore both hollow. Inside the side wall is a channel component 4C (e.g., wire) wound into a spiral flow passage.

The outer wall 4B of the evaporator 4 and the outer wall 2B of the reformer 2 are part of the same tube. This helps make the SOFC system 100 with fewer components.

The inner wall 4A and outer wall 4B of the evaporator 4 in the illustrated example are cylinders with different diameters, the inner wall 4A and outer wall 4B may be in other forms, such as rectangular tubes. However, making the inner wall 4A and outer wall 4B of the evaporator 4 as cylinders as in the SOFC system 100 according to this embodiment makes the evaporator 4 less costly to produce because cylinders can be produced with a shorter length and fewer points of welding than rectangular tubes. Cylinders, moreover, can be thin by virtue of being resistant to gas pressure and thermal stress compared with rectangular tubes.

As illustrated in FIG. 1, the high-temperature combustion exhaust passes through the space between the outer wall 4B of the evaporator 4 and the inner wall 54 of the enclosure of the SOFC system 100. The inside of the side wall of the evaporator 4 has therefore been heated by the heat of the combustion exhaust.

Near the lower end of the inner wall 4A of the evaporator 4 is a turnaround section 17. The turnaround section 17 has multiple openings (not illustrated) created along the inner wall 4A. A mixture feed path 14, a path for the mixture of the raw material and steam to flow through, runs through the lower plate 4D airtightly, extending vertically upward inside the evaporator 4. The upper end of the mixture feed path 14 is positioned lower than the top panel 52 and at a level where the mixture can flow smoothly from the inside of the evaporator 4 into the mixture feed path 14. The lower end of the mixture feed path 14 is positioned higher than the upper plate 2U and at a level where the mixture can flow smoothly from the inside of the bottom portion 4E of the evaporator 4 into the reforming catalyst 2E.

The fuel cell stack 6 generates electricity using the fuel gas and oxidant gas. The fuel cell stack 6 in the illustrated example is a solid oxide fuel cell (SOFC) stack, but other types also work. Likewise, the oxidant gas in the illustrated example is air, but other oxidant gases also work.

The cathode of the fuel cell stack 6 has been supplied with air through an air feed path 5, and the anode of the fuel cell stack 6 with the fuel gas through the fuel gas feed path 13, which is connected to the reformer 2. Further details of the air feed path 5 are given hereinafter.

Inside the fuel cell stack 6 are single fuel cells (not illustrated), for example multiple fuel cells connected in series. The fuel cell stack 6 can be a stack of multiple flat-plate cells or an assembly of multiple cylindrical cells.

Each cell in the fuel cell stack 6 includes a solid oxide electrolyte, an anode, and a cathode.

The solid oxide electrolyte may be an oxide-ion-conducting electrolyte conducting or proton-conducting electrolyte.

The anode of a cell is on a primary surface of the solid oxide electrolyte, and the cathode on the other primary surface. This construction is typical of common SOFCs and therefore is not described in further detail.

The air feed path 5 is a passage through which air to be sent to the cathode of the fuel cell stack 6 flows. Specifically, air is supplied to the air feed path 5 and then sent to the fuel cell stack 6.

The air feed path 5 is between the inner wall 54 and outer wall 53 of the enclosure of the SOFC system 100. The inner wall 54 extends from the top panel 52 of the enclosure of the SOFC system 100 to beneath the fuel cell stack 6 and covers the bottom of the fuel cell stack 6. The outer wall 53 covers the inner wall 54 from outside.

It should be noted that the SOFC system 100 operates at high temperatures (e.g., 600° C. or above). Thus the enclosure of the SOFC system 100 is often covered with a thermal insulator (not illustrated) to reduce the heat dissipation to the outside.

Anode off-gas discharge paths 11 are passages through which the anode off-gas discharged from the anode of the fuel cell stack 6 flows. Specifically, the anode off-gas as a gas containing, to name a few, hydrogen ($H_2$) not used in the power generation at the fuel cell stack 6, steam ($H_2O$), carbon monoxide (CO), and unreformed part of the raw material passes through the anode off-gas discharge paths 11 and then is sent to the anode off-gas collector 22 (described hereinafter) of the combustor 20.

In the illustrated example, the anode off-gas discharge paths 11 extend from the anode of the fuel cell stack 6 to the anode off-gas collector 22 of the combustor 20 through the lower section 50B and the separator 51. The number of anode off-gas discharge paths 11 does not need to be two.

A cathode off-gas discharge path is a passage through which the cathode off-gas discharged from the cathode of the fuel cell stack 6 flows. Specifically, air not used in the power generation at the fuel cell stack 6 (cathode off-gas) passes through this cathode off-gas discharge path and then is sent to the combustion space 25.

In the illustrated example, the cathode off-gas discharge path is formed by the space inside the lower section 50B, in which the fuel cell stack 6 is contained, and by the first cathode off-gas pass-through 23 and second cathode off-gas pass-through 30.

An air heat exchanger 7 exchanges heat between the air flowing through the air feed path 5 and the combustion exhaust flowing inside the inner wall 54. That is, the portion of the inner wall 54 exposed to the combustion exhaust transfers heat, serving as an air heat exchanger 7. Owing to this, ordinary-temperature air flowing down through the air feed path 5 is heated to a high temperature (e.g., approximately 600° C. to 700° C.) by exchanging heat with combustion exhaust flowing up inside the inner wall 54. Then the air is further heated with the use of the heat produced by the reforming reaction performed inside the fuel cell stack 6 to a temperature required for the power generation at the fuel cell stack 6 to take place, and then is supplied to the cathode of the fuel cell stack 6 from beneath the housing of the fuel cell stack 6. The combustion exhaust, on the other hand, is cooled to an appropriate temperature (e.g., approximately 100° C. to 200° C.) and then discharged out of the SOFC system 100. The discharged combustion exhaust may be sent to a heat exchanger (not illustrated) for making warm water for general purposes.

The combustor 20 combusts the anode and cathode off-gases discharged from the fuel cell stack 6.

The combustor 20 includes an anode off-gas collector 22. Besides being a place where the anode off-gas discharged from the anode of the fuel cell stack 6 is collected, the anode off-gas collector 22 has multiple anode off-gas nozzles 21, nozzles for ejecting the collected anode off-gas into the combustion space 25. The anode off-gas collector 22 surrounds the first cathode off-gas pass-through 23, through which the cathode off-gas discharged from the cathode of the fuel cell stack 6 passes.

As illustrated in FIG. 1, the anode off-gas collector 22 is a hollow toroid. The separator 51 has an opening created therethrough that allows the space surrounded by this toroid to communicate with the lower section 50B.

The space surrounded by the toroid including this opening is the first cathode off-gas pass-through 23. The openings created in the separator 51 around the anode off-gas collector 22 but inside the inner wall 54 constitute the second cathode off-gas pass-through 30.

In the first cathode off-gas pass-through 23, the cathode off-gas passes through the space surrounded by the anode off-gas collector 22. Since at the anode off-gas nozzles 21 the flames F are formed inward, or inclined toward the fuel gas feed path 13, it may be difficult to deliver the cathode off-gas to the outer edges of the flames F.

As a solution to this, part of the cathode off-gas is guided through the second cathode off-gas pass-through 30, a pass-through located outside the anode off-gas collector 22. This ensures the anode and cathode off-gases are mixed well even around the outer edges of the flames F, and the improved mixing of the cathode and anode off-gases results in further improved performance of the combustor 20. For example, roughly half the cathode off-gas discharged from the cathode of the fuel cell stack 6 may pass through the second cathode off-gas pass-through 30.

The anode off-gas nozzles 21 direct the anode off-gas gushing upward from the anode off-gas nozzles 21 toward the cathode off-gas rising through the first cathode off-gas pass-through 23. That is, the anode off-gas collector 22 has a tapered surface 22T sloping down to the first cathode off-gas pass-through 23, and the anode off-gas nozzles 21 have been created in this tapered surface 22T.

In this way, the anode and cathode off-gases discharged from the fuel cell stack 6 are ejected into the combustion space 25 separately. As a result, the anode off-gas that has gushed from the anode off-gas nozzles 21 and the cathode off-gas that has passed through the first cathode off-gas pass-through 23 and second cathode off-gas pass-through 30 are combusted by diffusion combustion in the combustion space 25.

The anode off-gas collector 22 in the SOFC system 100 according to this embodiment is a toroid, but the anode off-gas collector 22 can be in other shapes, such as a rectangular ring. However, forming the anode off-gas collector 22 as a toroid makes the anode off-gas collector 22 less costly to produce because a toroid can be produce with a shorter length and fewer points of welding, for example than a rectangular ring. A toroidal anode off-gas collector 22, moreover, can be thin by virtue of being resistant to gas pressure and thermal stress.

Although not illustrated in FIG. 1, the SOFC system 100 may include any equipment it requires to operate.

To name a few, if the oxidant gas supplied to the cathode of the fuel cell stack 6 is air, the SOFC system 100 has, for example, an air feeder (e.g., blower) for supplying the fuel cell stack 6 with the air for power generation.

If the reformer 2 performs steam reforming, the SOFC system 100 has, for example, a water feeder (e.g., pump) for supplying the evaporator 4 with water. If autothermal reforming is performed, the SOFC system 100 includes the water feeder plus, for example, an air feeder (e.g., blower) for supplying the reformer 2 with air for reforming.

The SOFC system 100 also has, at appropriate points in the combustion space 25, ignition devices (e.g., heaters or spark plugs) for igniting the combustor 20.

Moreover, the SOFC system 100 has at appropriate points therein temperature sensors for detecting the temperature of, for example, the reformer 2 and the fuel cell stack 6.

It should be noted that these various examples of equipment not illustrated in the drawings are given merely for illustrative and not for restrictive purposes.

In the SOFC system 100 according to this embodiment, the period of a low-to-high load-following operation (load-following operation in which the power output of the fuel cell stack 6 shifts from a lower level to a higher level) is divided into n sub-periods (s1, s2, ... , and sn; n is a natural number of 2 or more) at the time points when the flow rate of the raw material is increased. The increase amounts in the flow rate of the raw material during the n sub-periods are defined as f1, f2, ... , and fn (n is a natural number of 2 or more), and n ratios determined from the length of a sub-period sx selected from the n sub-periods and the increase amounts fx in the flow rate of the raw material during the selected sub-period sx are defined as rx (rx=fx/length of sx; x is a natural number and 1≤x≤n). When two ratios are selected from the n ratios with the one on the lower output side with respect to the power output of the fuel cell stack 6 as a first ratio and the other, on the higher output side with respect to the power output of the fuel cell stack 6, as a second ratio, the controller 40 controls the raw material feeder 41 to make the second ratio smaller than the first ratio. The events at which the period of the low-to-high load-following operation is divided into n sub-periods do not need to be increase amounts in the flow rate of the raw material; the period of the low-to-high load-following operation may be divided at time points selected at the user's discretion.

For example, the controller 40 may control the raw material feeder 41 to make the n ratios satisfy r1>r2> ... >rn.

In another case, the controller 40 may control the raw material feeder 41 to, for example, make the lengths of the n sub-periods satisfy s1<s2< ... <sn.

In another case, the controller 40 may control the raw material feeder 41 to, for example, make the n increase amounts in the flow rate of the raw material satisfy f1>f2> . . . >fn.

The controller 40 may control the overall operation of the SOFC system 100. The construction of the controller 40 is not critical as long as it has control capabilities. For example, the controller 40 includes a processor (not illustrated) and a storage (not illustrated) for storing the control program. The processor can be, for example, a microprocessor unit (MPU) or central processing unit (CPU). The storage can be, for example, a memory.

The controller 40 may be a single control unit that performs central control or may be composed of multiple control units that perform distributed control collaboratively.

By virtue of the controller 40 controlling the raw material feeder 41 in such a way, the SOFC system 100 according to this embodiment can perform better than the related art in low-to-high load-following operations while maintaining stable combustion in the combustor 20. This is described in further detail below in Examples 1 and 2.

Example 1

The SOFC system 100 in this Example is equivalent to the SOFC system 100 according to the embodiment except that the controller 40 controls the raw material feeder 41 as follows.

The controller 40 controls the raw material feeder 41 to make the sub-period longer with increasing power output of the fuel cell stack 6. During each of the multiple sub-periods, the controller 40 increases the current output of the fuel cell stack 6.

Figure 2:
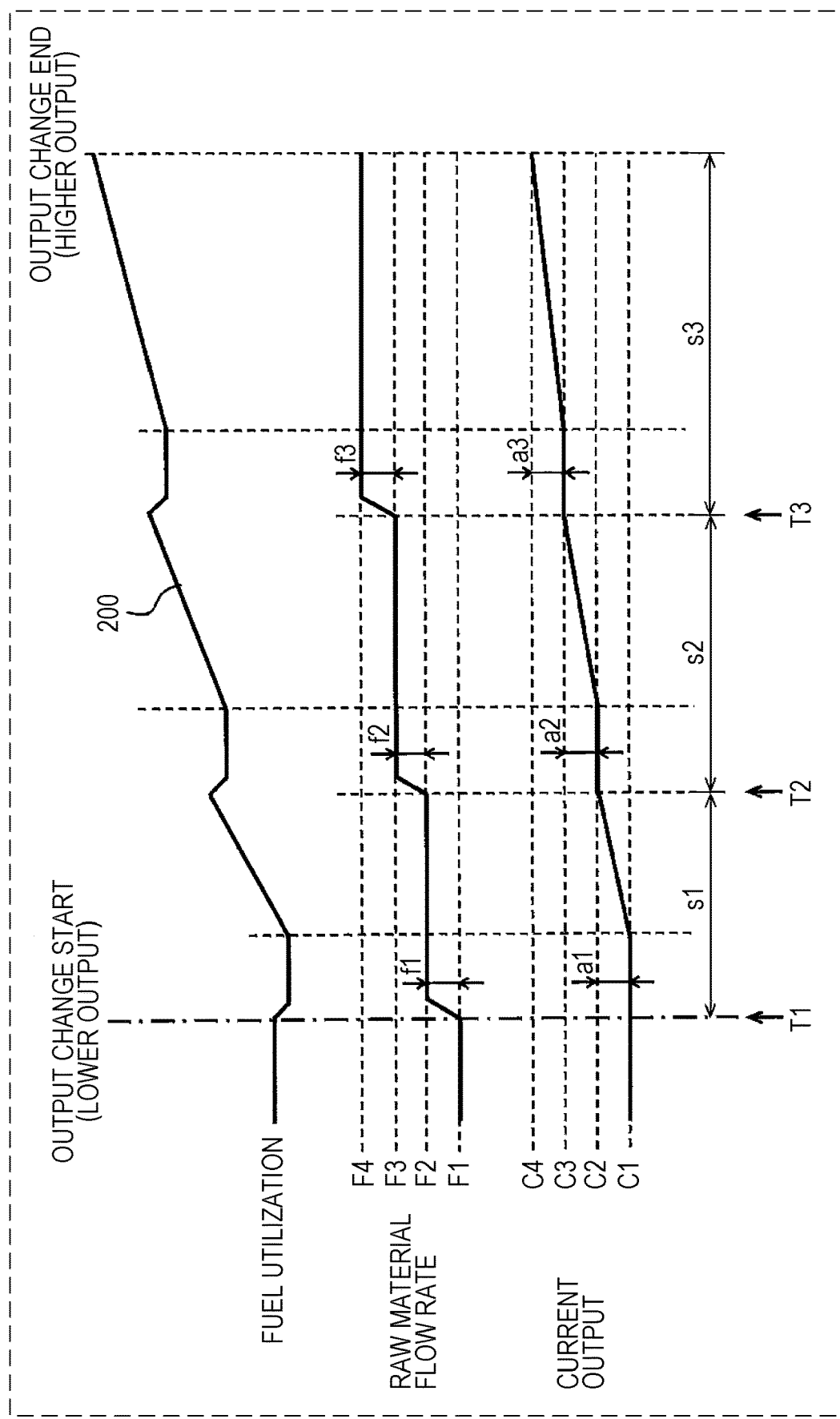
FIG. 2 illustrates an example of the operation of a fuel cell system in Example 1 of the embodiment.

FIG. 2 illustrates an example of the operation of a fuel cell system in Example 1 of the embodiment.

In FIG. 2, the horizontal axis represents time. The drawing includes examples of a graph of changes in the flow rate of the raw material over time, a graph of changes in the current output of the fuel cell stack 6 over time, and a fuel utilization graph 200, which represents changes in the fuel utilization in the fuel cell stack 6 over time. All graphs are those in a low-to-high load-following operation.

It should be noted that the graphs in FIG. 2 are schematic representations of how the flow rate of the raw material, current output, and fuel utilization tend to change. The illustrated changes are therefore not necessarily accurate.

As illustrated in FIG. 2, the period of a low-to-high load-following operation, in which the power output of the fuel cell stack 6 shifts from a lower level to a higher level, has been divided into multiple sub-periods s1, s2, and s3 at time points T1, T2, and T3 of flow-rate increase. During each of the sub-periods s1, s2, and s3, the current output of the fuel cell stack 6 increases with increasing flow rate of the raw material.

The increases f1, f2, and f3 in the flow rate of the raw material during the respective sub-periods s1, s2, and s3 are set constant (f1=f2=f3) in this Example, but the increases f1, f2, and f3 in the flow rate of the raw material may be set to be smaller with increasing power output of the fuel cell stack 6 (f1>f2>f3) as in Example 2. Likewise, the increases a1, a2, and a3 in the current output of the fuel cell stack 6 during the respective sub-periods s1, s2, and s3 are constant (a1=a2=a3) in this Example, but this is not the only option.

The sub-periods s1, s2, and s3, on the other hand, are longer with increasing power output of the fuel cell stack 6 (s1<s2<s3).

Assume that for two sub-periods s1 and s2 selected from the sub-periods s1, s2, and s3, two ratios r1 and r2 are determined from the increase f1 or f2 in the flow rate of the raw material and the length of the sub-period s1 or s2 (r1=f1/s1, and r2=f2/s2). When the two ratios r1 and r2 are compared, the ratio on the higher output side is smaller than that on the smaller output side (r1>r2).

For two sub-periods s1 and s3 selected from the sub-periods s1, s2, and s3, two ratios r1 and r3 are determined from the increase f1 or f3 in the flow rate of the raw material and the length of the sub-period s1 or s3 (r1=f1/s1, and r3=f3/s3). When the two ratios r1 and r3 are compared, the ratio on the higher output side is smaller than that on the smaller output side (r1>r3).

For two sub-periods s2 and s3 selected from the sub-periods s1, s2, and s3, two ratios r2 and r3 are determined from the increase f2 or f3 in the flow rate of the raw material and the length of the sub-period s2 or s3 (r2=f2/s2, and r3=f3/s3). When the two ratios r2 and r3 are compared, the ratio on the higher output side is smaller than that on the smaller output side (r2>r3).

Moreover, when the three ratios r1, r2, and r3, determined from the increase f1, f2, or f3 in the flow rate of the raw material and the length of the sub-period s1, s2, or s3 (r1=f1/s1, r2=f2/s2, and r3=f3/s3), for the respective sub-periods s1, s2, and s3 are compared, the ratios are smaller with increasing power output of the fuel cell stack 6 (r1>r2>r3).

When the power output of the fuel cell stack 6 is low, the current C1 output from the fuel cell stack 6 and the flow rate F1 of the raw material (e.g., town gas) are set to, for example, approximately 2 A and approximately 0.9 L/min, respectively. In this situation, the fuel utilization in the fuel cell stack 6 is maintained low (e.g., approximately 35%) to enable autothermal operation of the SOFC system 100.

A low-to-high load-following operation performed in this state begins with an increase in the flow rate of the raw material from F1 to F2. The increase starts at the time point T1 of flow-rate increase and continues for a predetermined time (e.g., approximately 3 to 10 seconds). In response to this, the fuel utilization graph 200 falls with increasing flow rate of the raw material.

Then the current output of the fuel cell stack 6 increases from C1 to C2 during the sub-period s1 (e.g., after a predetermined time has passed since the time point T1 but within the sub-period s1). The fuel utilization graph 200 synchronously rises with increasing current output of the fuel cell stack 6, with the fuel utilization increasing beyond that before the time point T1.

Then the flow rate of the raw material starts to increase at the time point T2 of flow-rate increase and increases from F2 to F3 over a predetermined time (e.g., approximately 3 to 10 seconds). In response to this, the fuel utilization graph 200 falls with increasing flow rate of the raw material.

Then the current output of the fuel cell stack 6 increases from C2 to C3 during the sub-period s2 (e.g., after a predetermined time has passed since the time point T2 but within the sub-period s2). The sub-period s2 is longer than the sub-period s1. The fuel utilization graph 200 synchronously rises with increasing current output of the fuel cell stack 6, with the fuel utilization increasing beyond that before the time point T2.

Then the flow rate of the raw material starts to increase at the time point T3 of flow-rate increase and increases from F3 to F4 over a predetermined time (e.g., approximately 3 to 10 seconds). In response to this, the fuel utilization graph 200 falls with increasing flow rate of the raw material.

Then the current output of the fuel cell stack 6 increases from C3 to C4 during the sub-period s3 (e.g., after a predetermined time has passed since the time point T3 but within the sub-period s3). The sub-period s3 is longer than the sub-period s2. The fuel utilization graph 200 synchronously rises with increasing current output of the fuel cell stack 6, with the fuel utilization increasing beyond that before the time point T3.

In this way, when the power output of the fuel cell stack 6 is high, the current C4 output from the fuel cell stack 6 and the flow rate F4 of the raw material (e.g., town gas) are set to, for example, approximately 7 A and approximately 2.0 L/min, respectively. At this point, the fuel utilization in the fuel cell stack 6 has reached a high (e.g., approximately 75%) to enable highly efficient operation of the SOFC system 100.

Overall, in the SOFC system 100 in this Example, the controller 40 increases the flow rate of the raw material and the current output of the fuel cell stack 6 in each of multiple sub-periods s1, s2, and s3 in a low-to-high load-following operation, a load-following operation in which the power output of the fuel cell stack 6 shifts from a lower level to a higher level. By virtue of this, the SOFC system 100 in this Example is capable of proper increase in the fuel utilization in the fuel cell stack 6 in low-to-high load-following operations.

If the sub-periods were shorter with increasing power output of the fuel cell stack 6 (s1>s2>s3), the fuel utilization would change more greatly with increasing power output. The combustor 20 would therefore easily misfire at high output level because, as mentioned, there is little difference between the normal and critical fuel utilization when the power output of the fuel cell stack 6 is high.

In the SOFC system 100 in this Example, by contrast, the change in the fuel utilization becomes milder with increasing power output of the fuel cell stack 6 by virtue of the sub-periods set to be longer with increasing power output. The combustor 20 therefore is less likely to misfire at high output level.

At low output level, too, the combustor 20 does not easily misfire despite the shorter sub-periods than at higher output level because, as mentioned, there is a large difference between the normal and critical fuel utilization when the power output of the fuel cell stack 6 is low. The SOFC system 100 in this Example, in which the sub-periods are set to be shorter with increasing power output, is therefore capable of low-to-high load-following operations shorter than they would otherwise be.

It should be noted that the above information such as the sub-periods s1 to s3, flow rates F1 to F4 of the raw material, currents C1 to C4, and fuel utilization level is given merely for illustrative and not for restrictive purposes.

For example, the sub-periods do not need to be three sub-periods s1 to s3. The number of sub-periods may be two or may be four or more. Likewise, the increases a1 to a3 between the currents C1 to C4 do not need to be constant. The increase may vary between the sub-periods s1 to s3.

Except for these features, the SOFC system 100 in this Example may be equivalent to the SOFC system 100 according to the embodiment.

Example 2

The SOFC system 100 in this Example is equivalent to the SOFC system 100 according to the embodiment except that the controller 40 controls the raw material feeder 41 as follows.

The controller 40 controls the raw material feeder 41 to make the increase in the flow rate of the raw material smaller with increasing power output of the fuel cell stack 6. During each of the multiple sub-periods, the controller 40 increases the current output of the fuel cell stack 6.

Figure 3:
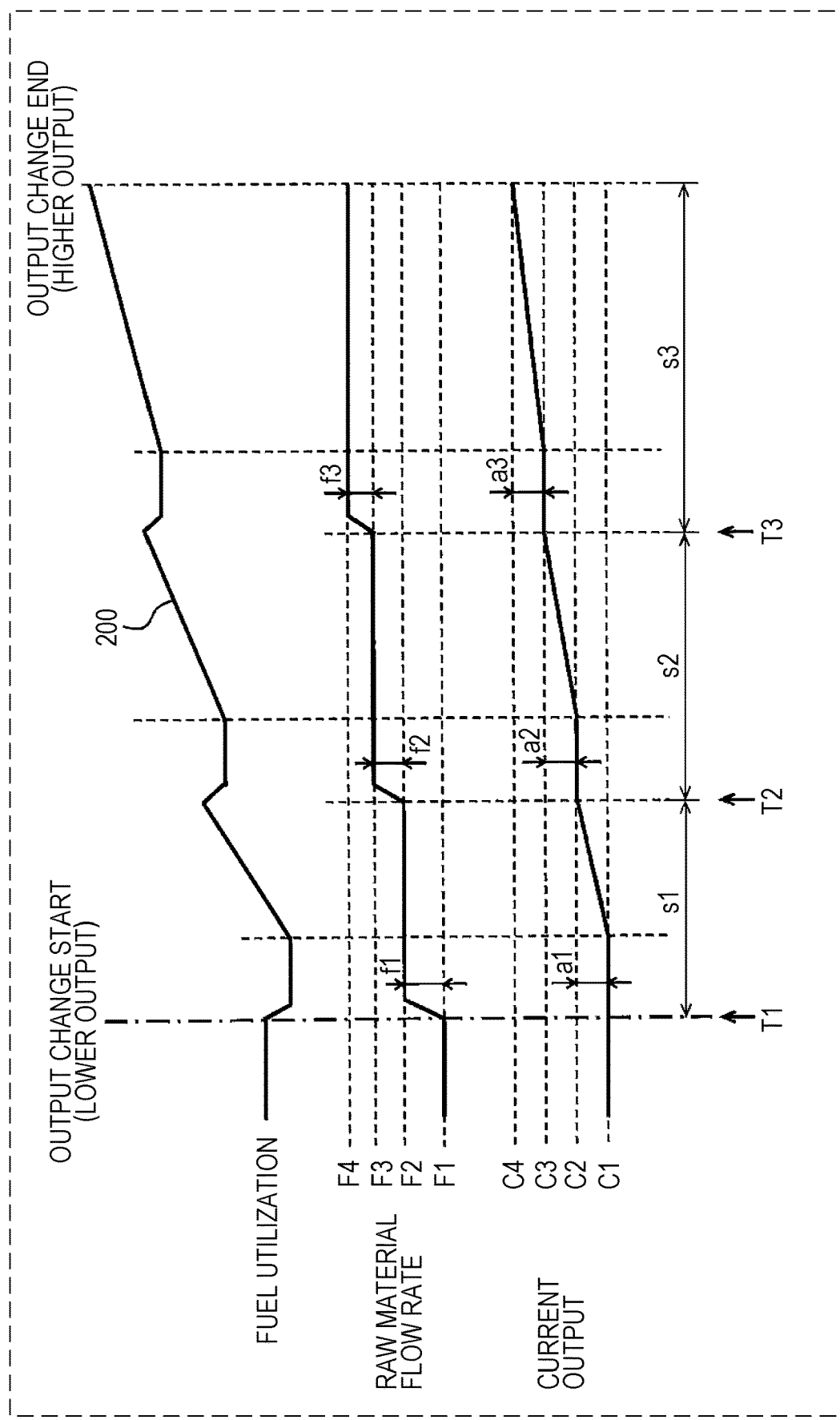
FIG. 3 illustrates an example of the operation of a fuel cell system in Example 2 of the embodiment.

FIG. 3 illustrates an example of the operation of a fuel cell system in Example 2 of the embodiment.

In FIG. 3, the horizontal axis represents time. The drawing includes examples of a graph of changes in the flow rate of the raw material over time, a graph of changes in the current output of the fuel cell stack 6 over time, and a fuel utilization graph 200, which represents changes in the fuel utilization in the fuel cell stack 6 over time. All graphs are those in a low-to-high load-following operation.

It should be noted that the graphs in FIG. 3 are schematic representations of how the flow rate of the raw material, current output, and fuel utilization tend to change. The illustrated changes are therefore not necessarily accurate.

In the SOFC system 100 in Example 1 (FIG. 2), the increases f1, f2, and f3 in the flow rate of the raw material during multiple sub-periods s1, s2, and s3 are set constant (f1=f2=f3). Unlike that, in the SOFC system 100 in this Example, the increases f1, f2, and f3 in the flow rate of the raw material are set to be smaller with increasing output of the fuel cell stack 6 (f1>f2>f3). The increases a1, a2, and a3 in the current output of the fuel cell stack 6 during the respective sub-periods s1, s2, and s3 are set constant (a1=a2=a3) in this Example, too, but this is not the only option.

The sub-periods s1, s2, and s3, on the other hand, may be set constant (s1=s2=s3) or set to be longer with increasing power output of the fuel cell stack 6 (s1<s2<s3) as in Example 1. In the SOFC system 100 in this Example, the sub-periods s1, s2, and s3 are set to be longer with increasing power output of the fuel cell stack 6 (s1<s2<s3) as in Example 1.

Assume that for two sub-periods s1 and s2 selected from the sub-periods s1, s2, and s3, two ratios r1 and r2 are determined from the increase f1 or f2 in the flow rate of the raw material and the length of the sub-period s1 or s2 (r1=f1/s1, and r2=f2/s2). When the two ratios r1 and r2 are compared, the ratio on the higher output side is smaller than that on the smaller output side (r1>r2).

For two sub-periods s1 and s3 selected from the sub-periods s1, s2, and s3, two ratios r1 and r3 are determined from the increase f1 or f3 in the flow rate of the raw material and the length of the sub-period s1 or s3 (r1=f1/s1, and r3=f3/s3). When the two ratios r1 and r3 are compared, the ratio on the higher output side is smaller than that on the smaller output side (r1>r3).

For two sub-periods s2 and s3 selected from the sub-periods s1, s2, and s3, two ratios r2 and r3 are determined from the increase f2 or f3 in the flow rate of the raw material and the length of the sub-period s2 or s3 (r2=f2/s2, and r3=f3/s3). When the two ratios r2 and r3 are compared, the ratio on the higher output side is smaller than that on the smaller output side (r2>r3).

Moreover, when the three ratios r1, r2, and r3, determined from the increase f1, f2, or f3 in the flow rate of the raw material and the length of the sub-period s1, s2, or s3 (r1=f1/s1, r2=f2/s2, and r3=f3/s3), for the respective sub-periods s1, s2, and s3 are compared, the ratios are smaller with increasing power output of the fuel cell stack 6 (r1>r2>r3).

When the power output of the fuel cell stack 6 is low, the current C1 output from the fuel cell stack 6 and the flow rate F1 of the raw material (e.g., town gas) are set to, for example, approximately 2 A and approximately 0.9 L/min, respectively. In this situation, the fuel utilization in the fuel cell stack 6 is maintained low (e.g., approximately 35%) to enable autothermal operation of the SOFC system 100.

A low-to-high load-following operation performed in this state begins with an increase in the flow rate of the raw material from F1 to F2 (increase f1). The increase starts at a time point T1 of flow-rate increase and continues for a predetermined time (e.g., approximately 3 to 10 seconds). In response to this, the fuel utilization graph 200 falls with increasing flow rate of the raw material.

Then the current output of the fuel cell stack 6 increases from C1 to C2 during the sub-period s1 (e.g., after a predetermined time has passed since the time point T1 but within the sub-period s1). The fuel utilization graph 200 synchronously rises with increasing current output of the fuel cell stack 6, with the fuel utilization increasing beyond that before the time point T1.

Then the flow rate of the raw material starts to increase at a time point T2 of flow-rate increase and increases from F2 to F3 (increase f2; f1>f2) over a predetermined time (e.g., approximately 3 to 10 seconds). In response to this, the fuel utilization graph 200 falls with increasing flow rate of the raw material.

Then the current output of the fuel cell stack 6 increases from C2 to C3 during the sub-period s2 (e.g., after a predetermined time has passed since the time point T2 but within the sub-period s2). The sub-period s2 is longer than the sub-period s1. The fuel utilization graph 200 synchronously rises with increasing current output of the fuel cell stack 6, with the fuel utilization increasing beyond that before the time point T2.

Then the flow rate of the raw material starts to increase at the time point T3 of flow-rate increase and increases from F3 to F4 (increase f3; f2>f3) over a predetermined time (e.g., approximately 3 to 10 seconds). In response to this, the fuel utilization graph 200 falls with increasing flow rate of the raw material.

Then the current output of the fuel cell stack 6 increases from C3 to C4 during the sub-period s3 (e.g., after a predetermined time has passed since the time point T3 but within the sub-period s3). The sub-period s3 is longer than the sub-period s2. The fuel utilization graph 200 synchronously rises with increasing current output of the fuel cell stack 6, with the fuel utilization increasing beyond that before the time point T3.

In this way, when the power output of the fuel cell stack 6 is high, the current C4 output from the fuel cell stack 6 and the flow rate F4 of the raw material (e.g., town gas) are set to, for example, approximately 7 A and approximately 2.0 L/min, respectively. At this point, the fuel utilization in the fuel cell stack 6 has reached a high (e.g., approximately 75%) to enable highly efficient operation of the SOFC system 100.

Overall, in the SOFC system 100 in this Example, the controller 40 increases the flow rate of the raw material and the current output of the fuel cell stack 6 in each of multiple sub-periods s1, s2, and s3 in a low-to-high load-following operation, a load-following operation in which the power output of the fuel cell stack 6 shifts from a lower level to a higher level. By virtue of this, the SOFC system 100 in this Example is capable of proper increase in the fuel utilization in the fuel cell stack 6 in low-to-high load-following operations.

If the increase amounts in the flow rate of the raw material were larger with increasing power output of the fuel cell stack 6 (f1<f2<f3), the combustor 20 would become more likely to misfire with increasing power output.

The following describes the reason for this with reference to the construction of the combustor 20 illustrated in FIG. 1.

Assume diffusion combustion in the combustor 20 illustrated in FIG. 1, in which anode off-gas ejected from anode off-gas nozzles 21 and cathode off-gas coming through a first cathode off-gas pass-through 23 and a second cathode off-gas pass-through 30 are combusted in a combustion space 25. In this situation, making greater increase amounts in the flow rate of the raw material with increasing power output of the fuel cell stack 6 means that the flow rate of the anode off-gas ejected from the anode off-gas nozzles 21 becomes faster with increasing power output. At high output level, therefore, the combustor 20 is easily caused to misfire by adverse effects (e.g., flame floating and vanishing in the combustion space 25) resulting from the increased flow rate of the anode off-gas at the anode off-gas nozzles 21 because, as mentioned, there is little difference between the normal and critical fuel utilization when the power output of the fuel cell stack 6 is high.

In the SOFC system 100 in this Example, by contrast, this disadvantage is not as serious by virtue of the increase amounts in the flow rate of the raw material set to be smaller with increasing power output of the fuel cell stack 6 (f1>f2>f3). The combustor 20 therefore is less likely to misfire at high output level.

At low output level, too, the combustor 20 does not easily misfire despite the larger increase amounts in the flow rate of the raw material than at higher output level because, as mentioned, there is a large difference between the normal and critical fuel utilization when the power output of the fuel cell stack 6 is low. The SOFC system 100 in this Example, in which the increase amounts in the flow rate of the raw material are set to be larger on the lower output than on the higher output side, is therefore capable of increasing the flow rate of the raw material faster than it otherwise would.

It should be noted that the above information such as the sub-periods s1 to s3, flow rates F1 to F4 of the raw material, currents C1 to C4, and fuel utilization level is given merely for illustrative and not restrictive purposes.

For example, the sub-periods do not need to be three sub-periods s1 to s3. The number of sub-periods may be two or may be four or more. Likewise, the increases a1 to a3 between the currents C1 to C4 do not need to be constant. The increase may vary between the sub-periods s1 to s3.

Except for these features, the SOFC system 100 in this Example may be equivalent to the SOFC system 100 according to the embodiment or in Example 1.

The embodiment, Example 1 of the embodiment, and Example 2 of the embodiment may be combined unless mutually exclusive.

From the foregoing description, many improvements to and other embodiments of the present disclosure are apparent to those skilled in the art. The foregoing description should therefore be construed only as an illustration and is provided in order to teach those skilled in the art the best mode of carrying out the present disclosure. The details of the structures and/or functions set forth herein can be substantially changed without departing from the spirit of the present disclosure.

An aspect of the present disclosure can be applied to fuel cell systems that can perform better than the related art in low-to-high load-following operations, load-following operations in which the power output of a fuel cell stack shifts from a lower level to a higher level, while maintaining stable combustion in a combustor.

What is claimed is:

1. A fuel cell system comprising:
a fuel cell stack that generates electricity using fuel gas and oxidant gas;
a reformer that produces the fuel gas by reforming a raw material;
a raw material feeder that supplies the raw material to the reformer;
a combustor that combusts anode off-gas discharged from an anode of the fuel cell stack; and
a controller that controls the raw material feeder, wherein
a period of a load-following operation, in which power output of the fuel cell stack shifts from a lower level to a higher level, is divided into n successive sub-periods s1, s2, . . . , and sn, where n is a natural number of 2 or more,
amounts by which flow rates of the raw material increase during each successive sub-period of the n successive sub-periods are defined as f1, f2, . . . , and fn, respectively, and
n ratios rx (where x is a natural number and $1 \leq x \leq n$), each determined from a length of a sub-period sx selected from the n successive sub-periods and an amount fx by which a flow rate of the raw material increases during the selected sub-period sx, are defined as rx=fx/length of sx, where x is a natural number and $1 \leq x \leq n$,
wherein each of f1, f2, . . . , and fn is larger than 0, and
when two ratios are selected from the n ratios with the ratio on a lower output side as a first ratio and the ratio on a higher output side as a second ratio, the controller controls the raw material feeder to make the second ratio smaller than the first ratio.

2. The fuel cell system according to claim 1, wherein the controller controls the raw material feeder to make the n ratios satisfy r1>r2> . . . >rn.

3. The fuel cell system according to claim 2, wherein the controller controls the raw material feeder to make the lengths of the n successive sub-periods satisfy s1<s2< . . . <sn.

4. The fuel cell system according to claim 3, wherein the controller increases current output of the fuel cell stack during each of the n successive sub-periods.

5. The fuel cell system according to claim 2, wherein the controller controls the raw material feeder such that the amounts by which flow rates of the raw material increase during each sub-period of the n successive sub-periods satisfy the relationship f1>f2> . . . >fn.

6. The fuel cell system according to claim 5, wherein the controller increases current output of the fuel cell stack in each of the n successive sub-periods.

7. The fuel cell system according to claim 1, wherein the fuel cell stack is a solid oxide fuel cell stack.

8. The fuel cell system according to claim 1, wherein each of the n successive sub-periods is divided into at time points when the flow rate of the raw material starts to increase.

9. The fuel cell system according to claim 1, wherein the flow rate of the raw material is constant after a predetermined time has elapsed in each of the n successive sub-periods where the flow rates of raw material continue to increase over the predetermined time.

* * * * *